United States Patent [19]

Ganong

[11] Patent Number: 5,280,563
[45] Date of Patent: Jan. 18, 1994

[54] METHOD OF OPTIMIZING A COMPOSITE SPEECH RECOGNITION EXPERT

[75] Inventor: William F. Ganong, Brookline, Mass.

[73] Assignee: Kurzweil Applied Intelligence, Inc., Waltham, Mass.

[21] Appl. No.: 812,581

[22] Filed: Dec. 20, 1991

[51] Int. Cl.$^5$ .............................................. G10L 9/00
[52] U.S. Cl. ................................................... 395/2
[58] Field of Search ................................... 381/29–46; 395/2

[56] References Cited

U.S. PATENT DOCUMENTS 4,741,036  4/1988  Bahl et al. ............................. 381/43
4,926,488  5/1990  Nadas et al. .......................... 381/46

OTHER PUBLICATIONS

Yen-Lu Chow—"Maximum Mutual Information Estimation of HMM Parameters or Continuous Speech Recognition Using the N-Best Algorithm"—1990 IEEE—pp. 701–704.

Primary Examiner—Michael R. Fleming
Assistant Examiner—Michelle Doerrler
Attorney, Agent, or Firm—Henry D. Pahl, Jr.

[57] ABSTRACT

In a continuous speech recognizer which includes at least, one acoustic expert and one linguistic expert which generate respective scores, a method is disclosed for adjusting the relative weighting to be applied to those scores employing training data utilizing the words to be recognized in multiple word phrases. Multiple word test phrases are applied to the acoustic expert to determine, for each phrase, plural multi-word hypotheses each having corresponding cumulative scores. The linguistic expert generates corresponding cumulative linguistic scores. An objective function is calculated for each test phrase having a value which is variable as a function of the difference between the combined score of any correct hypothesis and that of the most easily confused incorrect hypothesis. The objective function values are cumulated and a gradient descent procedure is used to adjust the relative weighting of the acoustic and linguistic scores in obtaining a combined score.

7 Claims, 1 Drawing Sheet

Microfiche Appendix Included
(1 Microfiche, 21 Pages)

METHOD OF OPTIMIZING A COMPOSITE SPEECH RECOGNITION EXPERT

MICROFICHE APPENDIX

The disclosure in this case includes a microfiche appendix of computer program listings comprising one microfiche of 21 frames.

BACKGROUND OF THE INVENTION

The present invention relates to speech recognition and more particularly to a method for adjusting the importance or relative weight to be given to the scores provided by each of a plurality of systems or comparative information sources analyzing continuous speech. The scoring systems or information sources are referred to herein as "experts".

As is understood by those skilled in the art, the accuracy of word recognition by an acoustic speech analyzer can be improved by the application or utilization of contextual knowledge. In other words, selection of a most likely candidate from a predetermined vocabulary of word models to match an unknown speech segment can be improved by considering whether it is likely that a given candidate would properly follow a previous word or words in the sequence of speech being analyzed. Further, multiple linguistic systems or analyses may be applied, e.g. a first utilizing only the preceding word and another utilizing two or three preceding words. Each of these systems in the context of the present invention may be considered to be an "expert". Likewise, since there are various ways of performing acoustic analysis of input speech, there may be more than one acoustic expert, e.g. the three so-called codebooks utilized by the well known Sphinx recognizer system. In general, it is conventional for each such expert to return a score which represents the likelihood that the unknown speech matches a given model in the vocabulary of the recognizer. These scores are commonly presented as minus log probabilities.

In order to combine the scores for the several expert systems so as to arrive at an overall likelihood of match, some estimate for determining the relative importance or weighting for the different experts must be provided. Often, this weighting is determined essentially arbitrarily, based upon the system designer's experience. If the scores were each good, independent probability estimates, they could be combined simply by multiplication. Typically, however, the scores are not independent but rather are interrelated.

In the case of an isolated word recognizer, statistical methods can be applied to improve the relative weighting provided there exists a training database containing acoustic samples of the various individual words to be recognized. As will be understood, however, spoken samples generated in an isolated word context will not be most accurate for continuous speech recognition since, in continuous speech, there will be a substantial degree of co-articulation or interaction between the words spoken in a phrase. It is not, however, feasible to build a vocabulary of phrases since the database would be almost boundless to encompass all reasonable permutations of the individual words contemplated in a useful vocabulary. Thus, the recognizer's vocabulary must of necessity be made up of individual words.

The present invention relates to a method of adjusting the relative weighting to be applied to scores generated by multiple experts in a continuous speech recognizer where training data for this purpose is obtained in the form of multiple word phrases rather than isolated words. The application of numerical methods to this problem, however, is not straightforward or obvious since, in the context of a multi-word phrase, a correct individual word can be part of both correct multi-word hypotheses and incorrect multi-word hypotheses.

As indicated previously, it is not feasible to build a vocabulary of phrases to be recognized but, rather, even in continuous speech recognition, the recognizer is essentially constrained to proceed on a word by word or sound by sound basis and each expert employed in the overall system will provide scores representing a likelihood of match between each unknown speech segment and the word models in the system's vocabulary. In this context, the term "word" is used in a generic sense so as to encompass sub word fragments such as the mora which make up the Japanese spoken language or phoneme or syllables of the English language.

The method of the present invention is based in large part on the recognition that an objective function can be derived which can compare or analyze the cumulative scores of a plurality of multi-word hypotheses propounded by the multiple experts and that the relative weighting coefficients for the several experts can be systematically adjusted to maximize the performance of the objective function and thereby improve the recognition accuracy of the system.

SUMMARY OF THE INVENTION

In the method of the present invention, the relative weighting coefficients applied to respective scores generated by an acoustic expert and a linguistic expert in a continuous speech recognizer are adjusted employing speech training data utilizing the words to be recognized in multiple word phrases. The multiple word phrases are submitted to the acoustic expert thereby to determine, for each phrase, plural multi-word hypotheses, each having a corresponding cumulative score. The hypotheses are submitted to the linguistic expert to determine for each hypothesis a corresponding cumulative score. The acoustic and linguistic cumulated scores are combined for each hypothesis using weighting coefficients initially arbitrarily selected to obtain a respective combined hypothesis score. If any hypothesis is correct for a submitted phrase, an objective function is computed having a value which is variable as a function of the difference between the combined score of the correct, hypothesis and that of at least one incorrect hypothesis. The objective function values are cumulated over all phrases which produced a correct hypothesis and a vector direction of adjustment of the weighting coefficients is calculated which improves the cumulated objective function values. An adjustment of the coefficients in that vector direction is then made. Preferably, the direction determining and adjustment steps are repeated to seek the best value for coefficients.

DESCRIPTION OF THE PREFERRED EMBODIMENT

Figure 1:
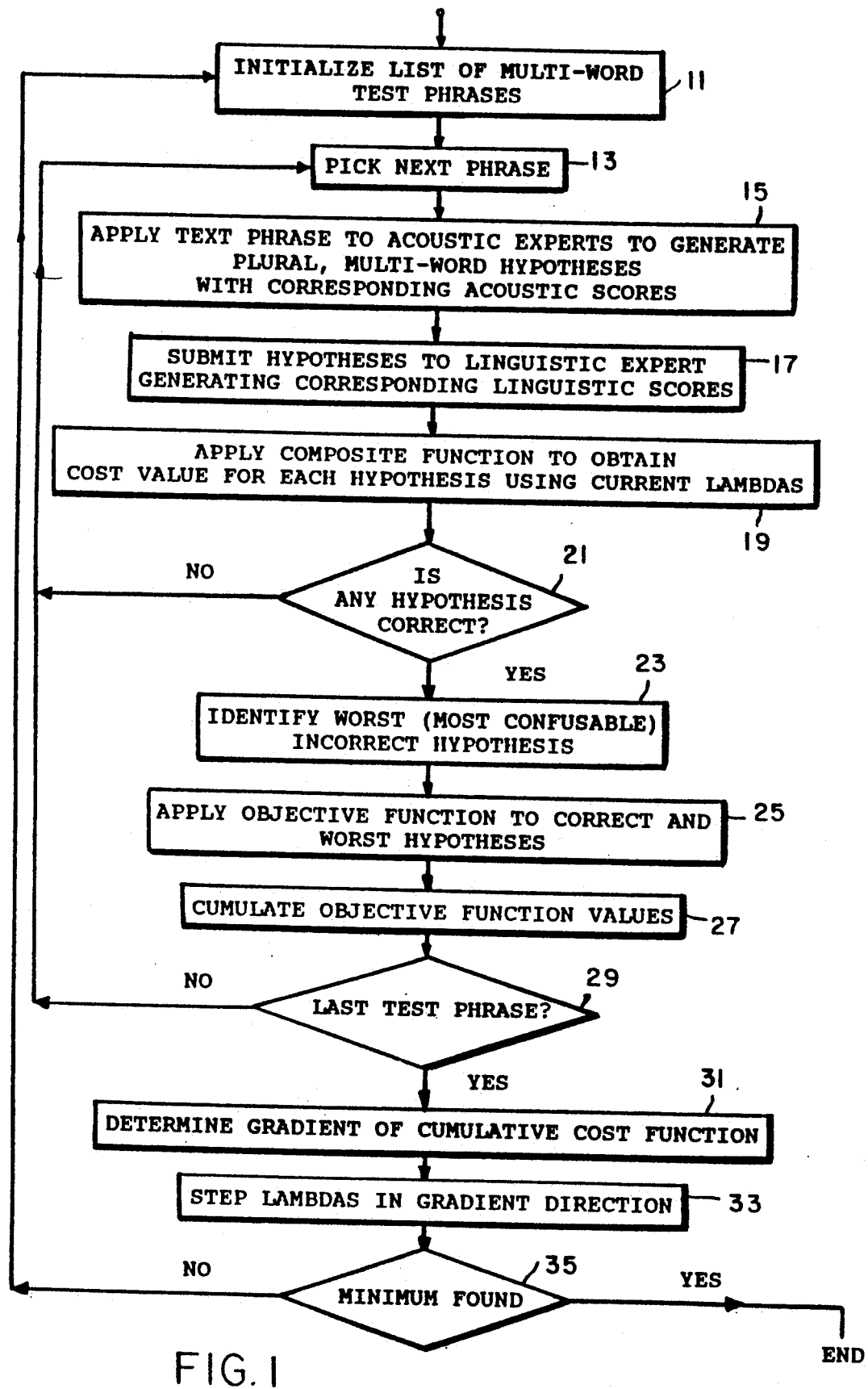
FIG 1 is a flowchart illustrating the method of the present invention for adjusting the relative weighting coefficients to be applied to respective scores generated by plural experts in a continuous speech recognizer.

As indicated previously, it is impractical for an acoustic speech analyzer to be provided with models of multi-word phrases since the effective vocabulary would be prohibitively large. Rather, the acoustic expert is necessarily constrained to proceed on a word by word or mora by mora basis and must attempt to match each unknown speech segment with the individual models in its vocabulary. By selecting only likely candidates for each input segment, the acoustic expert can generate a plurality of multi-word hypotheses based on the permutations of the candidates for each word. Selection of a most likely phrase from the multiple hypotheses is effected by utilizing not only the raw acoustic scores but also scores provided by at least one linguistic expert. In accordance with one aspect of the present invention, the relative weighting to be applied to the acoustic and linguistic scores is adjusted based upon training data which utilizes the words to be recognized in multiple word phrases.

The method of the present invention utilizes a composite function to analyze the hypotheses obtained from the input utterances in the training data. The embodiment described herein by way of example is based upon a Japanese language continuous speech analyzer and thus each hypothesis is a sequence of morae. The composite function provides a composite score which is a measure of the likelihood that the hypothesis is correct, that is, the hypothesis is the correct mora sequence. As is indicated previously, the individual expert outputs are typically given as minus log probabilities.

In the embodiment particularly described herein by way of example, the outputs of the acoustic experts and the linguistic experts are treated in the same way and thus the composite function is designated as being "homogeneous". Other useful composite functions are described hereinafter. The particular composite function employed in the example may be stated as follows:

$$CF_{homogeneous}(W, hyp) = \sum_{m=1}^{N_{mora}} \sum_{e=1}^{N_{Experts}} W_e \log(P_e(m))$$

where
- m are the morae of the hypothesis
- $P_e(m)$ is the probability estimated expert e of seeing mora m.
- $\overline{W}$ is the vector of weights, and $W_e$ is the weight for a particular expert e.

An important purpose of the present invention is to use numerical methods to find or determine a set of lambdas which optimize overall recognition accuracy. In achieving this, the method of the present invention utilizes an objective function, the minimization of which is related to accuracy. The purpose of this objective function is to measure the degree to which the composite function discriminates between correct and incorrect hypotheses which explain or are obtained from the same test phrase.

The particular objective function utilized compares correct and incorrect hypotheses. In adjusting the lambdas using the training data, only test phrases which produce a correct hypothesis are utilized. Test phrases which produce no correct hypotheses are ignored or passed over. Further, in the particular embodiment illustrated, the correct hypothesis is compared with a single one of the other, incorrect hypothesis.

The single incorrect hypothesis is selected as the one which has the best score of the incorrect hypotheses, according to the composite function. This selected incorrect hypothesis is hereinafter designated the worst incorrect in the sense that it is the most difficult, i.e. the incorrect which would be most easily confused with the correct solution since it has the best, score of the incorrect hypotheses. In fact, as to individual test phrases, it may even be possible that the worst incorrect may have a better score than the correct hypothesis. The adjustment or learning function of the present invention operates to adjust the lambdas so as to improve the distinguishability of the correct hypotheses relative to the respective worst incorrect hypotheses for the entire group of test phrases which produce correct hypotheses. The particular objective function may be expressed as follows:

$$SmoothedErrorRate(W) = \\ \sum_{P=1}^{NPhrases} Sig(CF(W, Correct(P)) - \\ CF(W, WorstIncorrect(P)))/NPhrases$$

where:

$$Sig(x) = \frac{1}{1 + e^{-x}}$$

- CF is a composite function, such as $CF_{homogeneous}$, which was defined above.
- Correct is the correct hypothesis for a specific phrase.
- WorstIncorrect is the incorrect hypothesis with the "worst", i.e. least, or most like a correct score, for this test utterance.
- NPhrases is the number of phrases in the dataset used for training.

As is understood in the art, the use of a non-linear function such as the sigmoid function is useful in preventing extreme cases from having too great an effect on the overall result.

The technique used to optimize the lambda values is a form of gradient descent. This procedure is basically to start with a particular, arbitrarily chosen, configuration of lambdas; find the gradient of the objective function at that set of lambdas; and move a small step in the gradient direction. This is done repeatedly to find a local minimum.

To find the gradient of the objective function, it is necessary to find the gradient of the composite function. This may be determined as follows:

$$\frac{\partial}{\partial W} CF_{homogeneous}(W, hyp) =$$

$$\frac{\partial}{\partial W} \sum_{m=1}^{N_{mora}} \sum_{e=1}^{N_{Experts}} W_e \log(P_e(m)) =$$

$$\sum_{m=1}^{N_{mora}} \frac{\partial}{\partial W} \sum_{e=1}^{N_{Experts}} W_e \log P_e(m)$$

but $$\frac{\partial}{\partial W} \sum_{e'=1}^{N_{Experts}} W_{e'} \log P_{e'}(m) = \log P_e(m),$$

-continued $$\frac{\partial}{\partial W_e} CF_{homogeneous}(W, hyp) = \sum_{m=1}^{N_{mora}} \log(P_e(m))$$

Using the gradients of the composite function for the correct and worst incorrect hypotheses, the gradient of the cost or objective function can be calculated essentially as follows:

$$\frac{\partial}{\partial W} \sum_{P=1}^{NPhrases} Sig(CF(W, Correct(P))) -$$

$$CF(W, WorstIncorrect(P)))/NPhrases =$$

$$\sum_{P=1}^{NPhrases} \frac{\partial}{\partial W} Sig(CF(W, Correct(P))) -$$

$$CF(W, WorstIncorrect(P)))/NPhrases \; Sig'\;(CF(W, Correct(P)) -$$

$$CF(W, WorstIncorrect(P))) * =$$

$$\sum_{P=1}^{NPhrases} \left( \frac{\partial}{\partial W} CF(W, Correct(P)) - \right.$$

$$\left. \frac{\partial}{\partial W} CF(W, WorstIncorrect(P))/NPhrases \right.$$

The gradient of the objective function gives a vector direction of adjustment of the lambdas or coefficients which improves the cumulated objective function values. In following each calculation of a such a vector direction, a step change in that direction is made. This is done repeatedly to seek out a minimum as is conventional in the gradient descent technique. A particular computer implementation of the gradient descent technique as applied to the coefficients in a multiple expert speech recognizer is given in the microfiche appendix identified previously herein. In that particular embodiment, the stepsize is in fact adaptive in accordance with a well known search technique. It begins at a small value and then grows until steps of that size start to hurt the objective function and then the stepsize is reduced as the minimum is sought.

As indicated previously, the method of the present invention is based in large part on the recognition that an objective function can be derived which can compare or analyze the cumulative scores of a plurality of multi-word hypotheses, propounded by multiple experts. In actual practice, this realization is embodied in an iterative process for improving weighting coefficients. Such a process or method is illustrated in FIG. 1.

As indicated previously, the method utilizes a collection or list of multi-word test or training phrases. This list is initialized as indicated at block 11. The list is processed sequentially as indicated at block 13 and each phrase in turn is applied to an acoustic expert to generate plural multi-word hypotheses as indicated at block 15. Associated with each hypothesis are acoustic scores corresponding to the words in the hypothesis. The hypotheses in turn are submitted to at least one linguistic expert as indicated at block 17, thereby generating corresponding linguistic scores for each hypothesis.

As indicated at block 19, the selected composite function is applied to each hypothesis to obtain a respective cost value using current lambda or weighting values. If none of the hypotheses are correct for a given test or training phrase, none of the respective scores are utilized in the training procedure. Rather, the values for that phrase are ignored and a new phrase is selected for processing, as indicated at block 21.

For test phrases which produce a correct hypothesis, a worst or most confusable incorrect hypothesis is also identified. This is the hypothesis with the highest score which is not the correct hypothesis. This step is indicated at block 23. The objective function is then applied to the correct and worst hypotheses as indicated at block 25 and the objective function values are accumulated over the successive test or training phrases as indicated at block 27. Once all of the test phrases have been processed, as tested at block 29, the vector gradient of the cumulative cost function is determined, as indicated at block 31. The lambdas are then stepped in that direction, as indicated at block 33, and this process is repeated iteratively until a minimum is found as indicated at block 35. At this point the lambdas or weighting coefficients will have been adjusted to an optimum value which will produce the best recognition results for a given set of acoustic and linguistic expert characteristics.

ALTERNATIVE EMBODIMENTS

As indicated previously, the particular example which has been described is a homogeneous example in the sense that all the experts, both acoustic and linguistic, are treated essentially the same. Another approach is to utilize an objective function which is more like a Markov model in which the acoustic expert and the linguistic experts are treated somewhat differently. In this case, the composite function may be stated as follows:

$$CF_{markov}(W, hyp) = \sum_{m=1}^{N_{mora}} W_{Ac}\log(P_{Ac}(m)) +$$

$$W_{LM} \sum_{e=1}^{NExperts} W_e\log(P_e(m))$$

where
  m are the morae of the hypothesis
  $P_e(M)$ is the probability estimated expert e of seeing mora m (including the Acoustic Expert $P_{Ac}$ (m).
  $W_e$ is the weight given expert e, $W_{Ac}$ is the weight given the acoustic expert, and $W_{LM}$ is the weight given the language model score.

In the homogeneous mode, all experts are treated the same. In the "Markov" model, all linguistic model (LM) experts are combined into an LM score per hypothesis. This information is then used to calculate an LM score for the word; then -log LM scores and Acoustic scores are then lambda weighted together.

In the case of composite function, the calculation of gradients is somewhat changed and may be represented as follows:

$$\frac{\partial}{\partial W_{Ac}} CF_{markov}(W, hyp) =$$

$$\frac{\partial}{\partial W_{Ac}} \left( \sum_{m=1}^{N_{mora}} W_{Ac}\log(P_{Ac}(m)) + \right.$$

$$\left. W_{LM}\log\left(\sum_{e=1}^{NExperts} W_e P_e(m)\right) \right) =$$

$$\frac{\partial}{\partial W_{LM}} CF_{markov}(W,hyp) =$$

$$\frac{\partial}{\partial W_{KM}} \left( \sum_{m=1}^{N_{mora}} W_{Ac}\log(P_{Ac}(m)) + W_{LM}\log\left(\sum_{e=1}^{NExperts} W_e P_e(m)\right) \right) =$$

$$\sum_{m=1}^{N_{mora}} \log\left(\sum_{e=1}^{NExperts} W_e P_e(m)\right)$$

$$\frac{\partial}{\partial W_e} CF_{markov}(W,hyp) =$$

$$\frac{\partial}{\partial W_e}\left(\sum_{m=1}^{N_{mora}} W_{LM}\log\left(\sum_{e=1}^{NExperts} W_e P_e(m)\right)\right) =$$

$$W_{LM} \sum_{m=1}^{N_{mora}} \frac{\partial}{\partial W_e} \log\left(\sum_{e=1}^{NExperts} W_e P_e(m)\right).$$

since $fg'(x) = f(g(x)g'(x)$, $\log'(x) = 1/x$, and $$\frac{\partial}{\partial W_e} \sum_{e'=1}^{NExperts} W_{e'} P_{e'}(m) = P_e(m),$$

$$\frac{\partial}{\partial W_e} CF_{markov}(W,hyp) = W_{LM} \sum_{m=1}^{N_{mora}} \frac{P_e(m)}{\sum_{e'=1}^{NExperts} W_{e'} P_{e'}(m)}$$

for experts e, other than acoustics.

In many speech recognition systems, it is common to constrain the lambdas so that they sum to 1. In particular, in "Markov" systems, the lambdas can be interpreted as probabilities, in which case they not only sum to 1, but are also non-negative. In a homogeneous system, this interpretation is not possible, but it still may be desirable to require the lambdas to sum to I to prevent them from converging to zero or diverging to infinity. This can be accomplished in two ways either to define one of the lambdas to be one minus the sum of the others or to add to the cost functions a term that depends on the divergence between one and the total. The first of these is relatively straightforward but complicates the computation of the grads when evaluating the data set. The second method adds in a term computed independently of the training data. There is added to each cost function $$BetaCost(W) = \frac{\beta\left(1 - \sum_{e=1}^{NExperts} W_e\right)^2}{NExperts}$$

where e ranges over the relevant experts (i.e. all in the homogeneous case, and the LM experts in the Markov case); and beta is a weighting term to control how important the constraint is.

The gradient of this new term is:

$$\frac{\partial}{\partial W} BetaCost(W) = \frac{2\beta\left(\sum_{e=1}^{NExperts} W_e - 1\right)}{NExperts}$$

If we consider an objective function which is the sum of one of the cost functions discussed before, it's gradient is the sum of the corresponding grad calculated above, and gradient of BetaCost. Minimizing that objective function will lead to lambda values which have a sum near one, and which do well on recognition.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of adjusting the relative weighting coefficients to be applied to respective scores generated in a continuous speech recognizer which incorporates plural experts including at least an acoustic expert and a linguistic expert, the acoustic and linguistic experts generating respective scores for each work postulated from the system's vocabulary; said method comprising:

obtaining continuous speech training data utilizing the words to be recognized in multiple word phrases;

submitting said multiple word phrases to at least one acoustic expert thereby to determine, for each such phrase, plural multi-word hypotheses each having a corresponding cumulative acoustic score denoting likelihood of match;

submitting said hypotheses to at least one linguistic expert thereby to determine for each hypothesis a corresponding cumulative linguistic score denoting likelihood of match;

for each hypothesis, combining said acoustic and linguistic cumulative scores using weighting coefficients initially arbitrarily selected thereby to obtain a respective combined hypothesis score;

for each submitted multiple work phrase, determining if any hypothesis is correct and, if a correct hypothesis exists, identifying the hypothesis which has the best combined score of those hypotheses which are not the correct hypothesis computing an objective function having a value which is variable as a function of a difference calculated between the combined score of the correct hypothesis and the combined score of said identified incorrect hypothesis;

cumulating the objective function values over all phrases which produced at least one correct hypothesis; and calculating a vector direction of adjustment of said relative weighting coefficients which improves the cumulated objective function values; and making an adjustment of said relative weighting coefficients in that direction.

2. The method as set forth in claim 1 wherein the objective function corresponds to a summation over all words and over the plural experts of the weighted scores for each word.

3. The method as set forth in claim 2 wherein the cumulation of objective function values corresponds to a summation over all test phrases of a difference calculated between the objective function value for the correct hypothesis and the objective function value for the hypothesis which has the best combined score of those hypotheses which are not the correct hypothesis.

4. The method as set forth in claim 3 wherein a sigmoidal function is applied to each difference before summation.

5. The method as set forth in claim 4 wherein said sigmoidal function is defined essentially as:

$$Sig(x) = \frac{1}{1 + e^{-x}}$$

where x is the respective difference.

6. The method of adjusting the relative weighting coefficients to be applied to respective scores generated in a continuous speech recognizer which incorporates plural experts including at least an acoustic expert and a linguistic expert, the acoustic and linguistic experts generating respective scores for each word postulated from the system's vocabulary; said method comprising:
   obtaining continuous speech training data utilizing the words to be recognized in multiple word phrases;
   a) submitting said multiple work phrases to at least one acoustic expert thereby to determine, for each such phrase, plural multi-work hypotheses each having a corresponding cumulative acoustic score denoting likelihood of match;
   b) submitting said hypotheses to at least one linguistic expert thereby to determine for each hypothesis a corresponding cumulative linguistic score denoting likelihood of match
   c) for each hypothesis, combining said acoustic and linguistic cumulative scores using weighting coefficients initially arbitrarily selected thereby to obtain a respective combined hypothesis score;
   d) for each submitted phrase, determining if any hypothesis is correct and, if a correct hypothesis exists, computing an objective function having a value which is variable as a function of a difference calculated between the combined score of the correct hypothesis and the combined score of the hypothesis which has the best score of those hypotheses which are not the correct hypothesis;
   e) cumulating the objective function values over all phrases which produced at least one correct hypothesis; and
   f) calculating a vector direction of adjustment of said coefficients which improves the cumulated objective function values;
   g) making an adjustment of said coefficients in said direction; and
   repeating steps a)–g) at least once.

7. The method of adjusting the relative weighting coefficients to be applied to respective scores generated in a continuous speech recognizer which incorporates plural experts including at least an acoustic expert and a linguistic expert, the acoustic and linguistic experts generating respective scores for each work postulated from the system's vocabulary; said method comprising:
   obtaining continuous speech training data utilizing the words to be recognized in multiple word phrases;
   submitting said multiple word phrases to at least one acoustic expert thereby to determine, for each such phrase, plural multi-word hypotheses each having a corresponding cumulative acoustic score denoting likelihood of match;
   submitting said hypotheses to at least one linguistic expert thereby to determine for each hypothesis a corresponding cumulative linguistic score denoting likelihood of match;
   for each hypothesis, combining said acoustic and linguistic cumulative scores using weighting coefficients initially arbitrarily selected thereby to obtain a respective combined hypothesis score;
   for each submitted multiple work phrase, determining if any hypothesis is correct and, if a correct hypothesis exists,
   identifying the hypothesis which has the best combined score of those hypotheses which are not the correct hypothesis
   between the combined score of the correct hypothesis and the combined score of said identified incorrect hypothesis;
   adjusting said difference in accordance with a sigmoidal function $$Sig(x) = \frac{1}{1 + e^{-x}}$$

where x is the respective difference
   computing an objective function having a value which is variable as a function of the adjusted difference
   calculating a difference
   cumulating the objective function values over all phrases which produced at least one correct hypothesis; and
   calculating a vector direction of adjustment of said relative weighting coefficients which improved the cumulated objective function values; and
   making an adjustment of said relative weighting coefficients in that direction.

* * * * *

UNITED STATES PATENT AND TRADEMARK OFFICE
CERTIFICATE OF CORRECTION

PATENT NO. : 5,280,563

DATED : January 18, 1994

INVENTOR(S) : William F. Ganong

It is certified that error appears in the above-identified patent and that said Letters Patent is hereby corrected as shown below:

Column 2, end of line 24, and the beginning of line 25, "prepounded" should be --propounded--.

Column 3, line 44, $CF_{homogeneous}(W, hyp) = \sum_{m=1}^{Nmora} \sum_{e=1}^{NExperts} W_e \log(P_e(m))$ should be -- $CF_{homogeneous}(\overline{W}, hyp) = \sum_{m=1}^{Nmora} \sum_{e=1}^{NExperts} W_e \log(P_e(m))$ --.

Column 4, line 4, "scare" should be --score--.

Column 4, lines 21-32, $SmoothedErrorRate(W) =$ $$\sum_{P=1}^{NPhrases} Sig(CF(W, Correct(P)) - CF(W, WorstIncorrect(P)))/NPhrases$$

where:

$$Sig(x) = \frac{1}{1 + e^{-x}}$$

should be -- $SmoothedErrorRate(\overline{W}) =$ $$\sum_{P=1}^{NPhrases} Sig(CF(\overline{W}, Correct(P)) - CF(\overline{W}, WorstIncorrect(P)))/NPhrases$$

where:

$$Sig(x) = \frac{1}{1 + e^{-x}}$$

--.

UNITED STATES PATENT AND TRADEMARK OFFICE
CERTIFICATE OF CORRECTION

PATENT NO. : 5,280,563

DATED : January 18, 1994

INVENTOR(S) : William F. Ganong

It is certified that error appears in the above identified patent and that said Letters Patent is hereby corrected as shown below:

Column 4, lines 56-64, $\frac{\partial}{\partial W} CF_{homogeneous}(W, hyp) =$ $$\frac{\partial}{\partial W} \sum_{m=1}^{Nmora} \sum_{e=1}^{NExperts} W_e \log(P_e(m)) =$$

$$\sum_{m=1}^{Nmora} \frac{\partial}{\partial W} \sum_{e=1}^{NExperts} W_e \log P_e(m)$$

should be -- $\frac{\partial}{\partial \overline{W}} CF_{homogeneous}(\overline{W}, hyp)$ $$= \frac{\partial}{\partial \overline{W}} \sum_{m=1}^{Nmora} \sum_{e=1}^{NExperts} W_e \log(P_e(m))$$

$$= \sum_{m=1}^{Nmora} \frac{\partial}{\partial \overline{W}} \sum_{e=1}^{NExperts} W_e \log P_e(m) \qquad --.$$

UNITED STATES PATENT AND TRADEMARK OFFICE
CERTIFICATE OF CORRECTION

PATENT NO. : 5,280,563

DATED : January 18, 1994

INVENTOR(S) : William F. Ganong

It is certified that error appears in the above-identified patent and that said Letters Patent is hereby corrected as shown below:

Column 5, lines 11-28, $$\frac{\partial}{\partial W} \sum_{P=1}^{NPhrases} Sig(CF(W,Correct(P)) -$$

$$CF(W,WorstIncorrect(P)))/NPhrases =$$

$$\sum_{P=1}^{NPhrases} \frac{\partial}{\partial W} Sig(CF(W,Correct(P)) -$$

$$CF(W,WorstIncorrect(P)))/NPhrases \; Sig'\,(CF(W,Correct(P)) -$$

$$CF(W,WorstIncorrect(P))) * =$$

$$\sum_{P=1}^{NPhrases} \left( \frac{\partial}{\partial W} CF(W,Correct(P)) - \right.$$

$$\frac{\partial}{\partial W} CF(W,WorstIncorrect(P)))/NPhrases$$

should be --

$$\frac{\partial}{\partial \overline{W}} \sum_{P=1}^{NPhrases} Sig(CF(\overline{W},Correct(P)) - CF(\overline{W},WorstIncorrect(P)))/NPhrases$$

$$= \sum_{P=1}^{NPhrases} \frac{\partial}{\partial \overline{W}} Sig(CF(\overline{W},Correct(P)) - CF(\overline{W},WorstIncorrect(P)))/NPhrases$$

$$= \sum_{P=1}^{NPhrases} (\frac{\partial}{\partial \overline{W}} CF(\overline{W},Correct(P)) - \frac{\partial}{\partial \overline{W}} CF(\overline{W},WorstIncorrect(P)))$$
$$Sig'(CF(\overline{W},Correct(P)) - CF(\overline{W},WorstIncorrect(P))) *$$
$$/NPhrases$$

--.

UNITED STATES PATENT AND TRADEMARK OFFICE
CERTIFICATE OF CORRECTION

PATENT NO. : 5,280,563

DATED : January 18, 1994

INVENTOR(S) : William F. Ganong

Page 4 of 8

It is certified that error appears in the above-identified patent and that said Letters Patent is hereby corrected as shown below:

Column 6, lines 36-48, $$CF_{markov}(W,hyp) = \sum_{m=1}^{Nmora} W_{Ac}\log(P_{AC}(m)) +$$

$$W_{LM} \sum_{e=1}^{NExperts} W_e\log(P_e(m))$$

where
  m are the morae of the hypothesis
  $P_e(M)$ is the probability estimated expert e of seeing mora m (including the Acoustic Expert $P_{Ac}(m)$.
  $W_e$ is the weight given expert e, $W_{Ac}$ is the weight given the acoustic expert, and $W_{LM}$ is the weight given the language model score.

should be --

$$CF_{markov}(\overline{W},hyp) = \sum_{m=1}^{Nmora} W_{Ac} \log(P_{Ac}(m)) - W_{LM} \sum_{e=1}^{NExperts} W_e \log(P_e(m))$$

where
  m are the morae of the hypothesis
  $P_e(m)$ is the probability estimated
    expert e of seeing mora m (including the Acoustic Expert $P_{Ac}(m)$.
  $W_e$ is the weight given expert e, $W_{Ac}$ is the weight given the acoustic expert, and $W_{LM}$ is the weight given the language model score. --.

UNITED STATES PATENT AND TRADEMARK OFFICE
CERTIFICATE OF CORRECTION

PATENT NO. : 5,280,563

DATED : January 18, 1994

INVENTOR(S) : William F. Ganong

It is certified that error appears in the above-identified patent and that said Letters Patent is hereby corrected as shown below:

Column 6, line 58, through Column 7, line 37, $$\frac{\partial}{\partial W_{Ac}} CF_{markov}(W, hyp) =$$

$$\frac{\partial}{\partial W_{Ac}} \left( \sum_{m=1}^{Nmora} W_{Ac} \log(P_{Ac}(m)) - W_{LM} \log \left( \sum_{e=1}^{NExperts} W_e P_e(m) \right) \right) =$$

$$\sum_{m=1}^{Nmora} \log(P_{Ac}(m))$$

$$\frac{\partial}{\partial W_{LM}} CF_{markov}(W, hyp) =$$

$$\frac{\partial}{\partial W_{LM}} \left( \sum_{m=1}^{Nmora} W_{Ac} \log(P_{Ac}(m)) - W_{LM} \log \left( \sum_{e=1}^{NExperts} W_e P_e(m) \right) \right) =$$

$$- \sum_{m=1}^{Nmora} \log \left( \sum_{e=1}^{NExperts} W_e P_e(m) \right)$$

$$\frac{\partial}{\partial W_e} CF_{markov}(W, hyp) =$$

$$\frac{\partial}{\partial W_e} \left( \sum_{m=1}^{Nmora} W_{LM} \log \left( \sum_{e=1}^{NExperts} W_e P_e(m) \right) \right) =$$

$$W_{LM} \sum_{m=1}^{Nmora} \frac{\partial}{\partial W_e} \log \left( \sum_{e=1}^{NExperts} W_e P_e(m) \right).$$

since $/g'(x) = f'(g(x)g'(x)$, $\log'(x) = 1/x$ and $$\frac{\partial}{\partial W_e} \sum_{e=1}^{NExperts} W_e P_e(m) = P_e(m).$$

$$\frac{\partial}{\partial W_e} CF_{markov}(W, hyp) = W_{LM} \sum_{m=1}^{Nmora} \frac{P_e(m)}{\sum_{e=1}^{NExperts} W_e P_e(m)}$$

UNITED STATES PATENT AND TRADEMARK OFFICE
CERTIFICATE OF CORRECTION

PATENT NO. : 5,280,563                                        Page 6 of 8

DATED : January 18, 1994

INVENTOR(S) : William F. Ganong

It is certified that error appears in the above-identified patent and that said Letters Patent is hereby corrected as shown below:

should be --
$$\frac{\partial}{\partial W_{Ac}} CF_{markov}(\overline{W}, hyp)$$

$$= \frac{\partial}{\partial W_{Ac}} ( \sum_{m=1}^{Nmora} W_{Ac} \log(P_{Ac}(m)) - W_{LM} \log( \sum_{e=1}^{NExperts} W_e P_e(m)))$$

$$= \sum_{m=1}^{Nmora} \log(P_{Ac}(m))$$

$$\frac{\partial}{\partial W_{LM}} CF_{markov}(\overline{W}, hyp)$$

$$= \frac{\partial}{\partial W_{LM}} \sum_{m=1}^{Nmora} W_{Ac} \log(P_{Ac}(m)) - W_{LM} \log( \sum_{e=1}^{NExperts} W_e P_e(m))$$

$$= \sum_{m=1}^{Nmora} \log( \sum_{e=1}^{NExperts} W_e P_e(m))$$

$$\frac{\partial}{\partial W_e} CF_{markov}(\overline{W}, hyp)$$

$$= \frac{\partial}{\partial W_e} \sum_{m=1}^{Nmora} W_{LM} \log( \sum_{e=1}^{NExperts} W_e P_e(m))$$

$$= W_{LM} \sum_{m=1}^{Nmora} \frac{\partial}{\partial W_e} \log( \sum_{e=1}^{NExperts} W_e P_e(m)).$$

since $fg'(x) = f'(g(x)g'(x)$, $\log'(x) = 1/x$, and $\frac{\partial}{\partial W_e} \sum_{e'=1}^{NExperts} W_{e'} P_{e'}(m) = P_e(m)$, $$\frac{\partial}{\partial W_e} CF_{markov}(\overline{W}, hyp) = W_{LM} \sum_{m=1}^{Nmora} \frac{P_e(m)}{\sum_{e'=1}^{NExperts} W_{e'} P_{e'}(m)}$$

--.

UNITED STATES PATENT AND TRADEMARK OFFICE
CERTIFICATE OF CORRECTION

PATENT NO.   : 5,280,563
DATED        : January 18, 1994
INVENTOR(S)  : William F. Ganong It is certified that error appears in the above-identified patent and that said Letters Patent is hereby corrected as shown below:

Column 7, lines 57-62, $$BetaCost(W) = \frac{\beta \left(1 - \sum_{e=1}^{NExperts} W_e \right)^2}{NExperts}$$

should be --

$$BetaCost(\overline{W}) = \frac{\beta (1 - \sum_{e=1}^{NExperts} W_e)^2}{NExperts}$$ --.

Column 8, lines 1-6, $$\frac{\partial}{\partial W} BetaCost(W) = \frac{2\beta \left(\sum_{e=1}^{NExperts} W_e - 1\right)}{NExperts}$$

should be --

$$\frac{\partial}{\partial \overline{W}} BetaCost(\overline{W}) = \frac{2\beta (\sum_{e=1}^{NExperts} W_e - 1)}{NExperts}$$ --.

UNITED STATES PATENT AND TRADEMARK OFFICE
CERTIFICATE OF CORRECTION

PATENT NO. : 5,280,563
DATED : January 18, 1994
INVENTOR(S) : William F. Ganong

It is certified that error appears in the above-identified patent and that said Letters Patent is hereby corrected as shown below:

Claim 1, Column 8, line 28 "work" should be --word--; line 46, "work" should be --word--.

Claim 6, Column 9, line 31, "work" should be --word--; line 33, "multi-work" should be --multi-word--.

Claim 7, Column 10, line 12, "work" should be --word--; line 30, "work" should be --word--; line 54, "improved" should be --improves--.

Signed and Sealed this

Thirtieth Day of September, 1997

Attest:

BRUCE LEHMAN

Attesting Officer

Commissioner of Patents and Trademarks